United States Patent
Yates

(10) Patent No.: US 9,772,929 B2
(45) Date of Patent: *Sep. 26, 2017

(54) SYSTEM AND METHOD FOR AUTOMATED TESTING OF SOFTWARE APPLICATIONS WITH DYNAMIC USER INTERFACES SPANNING MULTIPLE TECHNOLOGIES

(71) Applicant: WORKSOFT, INC., Addison, TX (US)

(72) Inventor: Andres Matias Yates, Dallas, TX (US)

(73) Assignee: WORKSOFT, INC., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,155

(22) Filed: Mar. 31, 2015

(65) Prior Publication Data

US 2015/0205705 A1  Jul. 23, 2015

Related U.S. Application Data

(63) Continuation of application No. 13/006,759, filed on Jan. 14, 2011, now Pat. No. 8,997,053.

(60) Provisional application No. 61/295,042, filed on Jan. 14, 2010.

(51) Int. Cl.
*G06F 9/44* (2006.01)
*G06F 11/36* (2006.01)

(52) U.S. Cl.
CPC ............ *G06F 11/3664* (2013.01); *G06F 8/35* (2013.01); *G06F 8/38* (2013.01)

(58) Field of Classification Search
CPC ........... G06F 11/3664; G06F 8/35; G06F 8/38
See application file for complete search history.

(56) References Cited

U.S. PATENT DOCUMENTS

| | | | |
|---|---|---|---|
| 5,550,971 A | 8/1996 | Brunner et al. | |
| 5,640,537 A | 6/1997 | Jessen et al. | |
| 6,002,871 A * | 12/1999 | Duggan | G06F 11/3664 714/38.12 |

(Continued)

OTHER PUBLICATIONS

Ina Schieferdecker et al., "A Meta-model for TTCN-3", [Online], 2004, pp. 366-379, [Retrieved from Internet on Mar. 10, 2017], <http://download.springer.com/static/pdf/861/chp%253A10.1007%252F978-3-540-30233-9_27.pdf>.*

(Continued)

*Primary Examiner* — Ziaul A Chowdhury
(74) *Attorney, Agent, or Firm* — Howison & Arnott, LLP

(57) ABSTRACT

An automated software testing system tests a running application from a viewpoint of user of a graphical user interface of the running application. A programmed processor executes a plurality of meta-layer implementations defining controls of the graphical user interface using algorithms. Each of the meta-layer implementations receives at least one abstraction layer object as input and generates a second at least one abstraction layer object as output responsive to at least one of the algorithm for an associated identity, property, collection or meta-object. A plurality of declarative function modules define each algorithm for each of the plurality of meta-layer implementations. Each of the plurality of declarative function modules encapsulates a predetermined result responsive to execution of the declarative function without providing any detail of how the predetermined result is achieved.

12 Claims, 10 Drawing Sheets

(56) References Cited

U.S. PATENT DOCUMENTS

| | | |
|---|---|---|
| 6,681,383 B1 | 1/2004 | Pastor et al. |
| 6,694,482 B1 | 2/2004 | Arellano et al. |
| 6,802,058 B2 | 10/2004 | Banavar et al. |
| 6,907,546 B1 | 6/2005 | Haswell et al. |
| 6,930,695 B1 | 8/2005 | Pabla |
| 6,961,873 B2 | 11/2005 | Dubovsky |
| 6,973,655 B2 | 12/2005 | Jacquin et al. |
| 7,017,145 B2 | 3/2006 | Taylor |
| 7,320,120 B2 | 1/2008 | Rajarajan et al. |
| 7,461,385 B2 | 12/2008 | Winter |
| 7,526,498 B2 | 4/2009 | Dubovsky |
| 7,788,647 B2 | 8/2010 | Martin et al. |
| 7,895,522 B2 | 2/2011 | Wong et al. |
| 7,908,598 B2 | 3/2011 | Betts et al. |
| 7,913,231 B2 | 3/2011 | Stienhans et al. |
| 7,934,162 B2 | 4/2011 | Wong et al. |
| 7,979,849 B2 | 7/2011 | Feldstein et al. |
| 8,074,218 B2 * | 12/2011 | Eilam ................. G06F 8/10 714/746 |
| 8,087,007 B2 | 12/2011 | Duneau |
| 8,196,104 B2 | 6/2012 | Cohrs et al. |
| 8,214,805 B2 | 7/2012 | Stewart |
| 8,225,308 B2 * | 7/2012 | Sedukhin ............. G06F 8/10 709/220 |
| 8,280,925 B2 | 10/2012 | Arthursson et al. |
| 8,332,830 B2 | 12/2012 | Kantorowitz et al. |
| 8,381,227 B2 | 2/2013 | Shin et al. |
| 8,429,597 B2 | 4/2013 | Prigge et al. |
| 8,490,080 B2 | 7/2013 | Janzen |
| 8,683,440 B2 | 3/2014 | Pasternak |
| 8,694,967 B2 | 4/2014 | Grieves et al. |
| 8,799,866 B2 | 8/2014 | Bullard et al. |
| 2002/0101448 A1* | 8/2002 | Sanderson ............ G06F 8/38 715/762 |
| 2002/0132216 A1 | 9/2002 | Dohrmann |
| 2003/0078960 A1 | 4/2003 | Murren et al. |
| 2004/0187140 A1 | 9/2004 | Aigner et al. |
| 2005/0021533 A1* | 1/2005 | Ayachitula ....... G06F 17/30557 |
| 2005/0166094 A1* | 7/2005 | Blackwell .......... G06F 11/3664 714/38.14 |
| 2005/0187930 A1* | 8/2005 | Subramanian ...... G06F 11/3668 |
| 2005/0204356 A1 | 9/2005 | Sundararajan et al. |
| 2006/0059027 A1 | 3/2006 | Berenbach et al. |
| 2006/0112399 A1 | 5/2006 | Lessly |
| 2006/0212842 A1 | 9/2006 | Gossman et al. |
| 2008/0028384 A1 | 1/2008 | Dorn et al. |
| 2008/0059944 A1 | 3/2008 | Patterson et al. |
| 2008/0082959 A1 | 4/2008 | Fowler |
| 2008/0127103 A1 | 5/2008 | Bak |
| 2008/0189638 A1 | 8/2008 | Mody et al. |
| 2008/0250071 A1* | 10/2008 | Norring ................ G06F 8/38 |
| 2009/0007079 A1* | 1/2009 | Raghavan ............. G06F 9/443 717/132 |
| 2009/0119708 A1* | 5/2009 | Harrar .................. G06F 8/38 725/39 |
| 2009/0158243 A1 | 6/2009 | Bolarinwa |
| 2009/0240654 A1* | 9/2009 | Limber ................. G06F 8/35 |
| 2010/0064282 A1 | 3/2010 | Triou et al. |
| 2010/0146489 A1* | 6/2010 | Ortiz ................. G06F 11/3688 717/128 |
| 2010/0257539 A1* | 10/2010 | Narayanan ......... G06F 9/44526 719/311 |
| 2012/0204182 A1* | 8/2012 | Doteguchi .......... G06F 11/3664 718/102 |
| 2013/0117003 A1 | 5/2013 | Son et al. |
| 2013/0305223 A1 | 11/2013 | Eade et al. |
| 2016/0092339 A1* | 3/2016 | Straub ................ G06F 11/3612 717/124 |

OTHER PUBLICATIONS

Stéphane Ducasse et al., "Meta-environment and executable meta-language using smalltalk: an experience report", [Online], Mar. 2008, pp. 5-19, [Retrived from Internet on Mar. 10, 2017], <http://download.springer.com/static/pdf/971/art%253A10.1007%252Fs10270-008-0081-4.pdf>.*

Frederic Doucet et al., "Introspection in System-Level Language Frameworks: Meta-level vs. Integrated", [Online], IEEE-2003, pp. 1-6, [Retrieved from Internet on Oct. 12, 2017], <https://www.date-conference.com/proceedings-archive/PAPERS/2003/DATE03/PDFFILES/05A_4.PDF>.*

Hyun Cho et al., "Model-Driven Impact Analysis of Software Product Lines", [Online], 2011, pp. 275-303, [Retrieved from Internet on Mar. 12, 2017], <https://www.cs.drexel.edu/~yfcai/papers/2011/Model-Driven-Impact-Analysis-of-Software-Product-Lines2011.pdf>.*

Lu, et al., "A New Approach for Multi-device User Interface Design", 2007 IEEE; [Retrieved on May 23, 2013]; Retrieved from Internet <URL:http://ieeexplore.ieee.org/stamp/stamp.jsp?tp=&arnumber=4351559>; pp. 648-653.

Santos et al, "VisMashup: Streamlining the Creation of Custom Visualization Applications", 2009 IEEE; [retrieved on May 21, 2013]; Retrieved from Internet <URL:http://ieeexplore.ieee.org/stamp/stamp.jsp?tp=arnumber=5290771>; pp. 1539-1546.

Melia, et al, "A Model-Driven Development for GWT-Based Rich Internet Applications with OOH4RIA", 2008 IEEE; [retrieved on May 21, 2013]; Retrieved from Internet <URL:http://ieeexplore.ieee.org/stamp/stamp.jsp?tp=&arnumber=4577865>; pp. 13-23.

Melia, et al, "Architectural and Technological Variability in Rich Internet Applications", 2010 IEEE; [retrieved on May 21, 2013]; Retrieved from Internet <URL:http://ieeexplore.ieee.org/stamp/stamp.jsp?tp=&arnumber=5481364>; pp. 24-32.

Thevenin, Coutaz, "Plasticity of User Interfaces: Framework and Research Agenda", 1999 IOS Press; [retrieved on May 23, 2013]; Retrieved from Internet <URL:http://iihm.imag.fr/publs/1999/interact99_plasticite.pdf>; pp. 1-10.

Sendin, "Towards a Framework to Develop Plastic User Interfaces", 2003 Springer; [retrieved on May 23, 2013]; Retrieved from Internet <URL:http://link.springer.com/content/pdf/10.1007%2F978-3-540-45233-1_41.pdf>; pp. 428-433.

Schreiner, Goschka, "A Component Model for the AUTOSAR Virtual Function Bus", 2007 IEEE; [retrieved on May 23, 2013]; Retrieved from Internet <URL:http://ieeexplore.ieee.org/stamp/stamp.jsp?tp=&arnumber=4291189>; pp. 1-7.

Repo, Riekki, "Middleware Support for Implementing Context-Aware Multimodal User Interfaces", 2004 ACM; [retrieved on May 23, 2013]; Retrieved from Internet <URL:http://dl.acm.org/citation.cfm?id=1052411>; pp. 221-227.

Chen, et al, "GUI Test Script Organization with Component Abstraction", 2008 IEEE; [retrieved on Nov. 11, 2014]; Retrieved from Internet <URL:http://ieeexplore.ieee.org/stamp/stamp.jsp?tp=&arnumber=4579804>; pp. 128-134.

Nebeling, et al. "Interactive Development of Cross-Device User Interfaces", 2014 ACM; [retrieved on Nov. 11, 2014]; Retrieved from Internet <URL:http://dl.acm.org/citation.cfm?id=2556288>; pp. 2793-2802.

Silva, et al, "The GUISurfer Tool: Towards a Language Independent Approach to Reverse Engineering GUI Code"; 2010 ACM; [retrieved on Nov. 11, 2014]; Retrieved from Internet <URL:http://dl.acm.org/citation.cfm?id=1822018>; pp. 181-186.

* cited by examiner

```
<HTML>
 <TITLE>Login</TITLE>
 <BODY>
  <FORM action="Login.asp" method="post">
   <TABLE>
    <TR><TD>Username: <INPUT name="username"/></TD></TR>
    <TR><TD>Password: <INPUT type="password" name="password"/></TD></TR>
    <TR><TD><INPUT type="submit" value="Login"/></TD></TR>
   </TABLE>
  </FORM>
 </BODY>
</HTML>
```

FIG. 7A

| | |
|---|---|
| Execute | Execute represent the base logic integrated into each Declarative Function. It executes each child Declarative Function added to its collection passing its input array as the input to each child. The logic ends either when an executed child returns a false success indicator or all children return a true success indicator. The last child's Result pair is returned as Execute's result. In the event that no child Declarative Functions are present, the Result pair returns a true success indicator and the input control array. Each Declarative Function that inherits this logic may add additional pre-processing and may provide a different input control array when executing each child Declarative Function. |
| Get Child Collection | Get Child Collection executes each of its child Declarative Functions passing as their input the control array returned as a result of executing the Child Collection with the provided Name. |
| Name | The name of a Child Collections meta-object defined within the same implementation. |
| Verify Collection Count | Verify Collection Count performs a verification using the Count property of its input control array. If verification fails, execution returns with a Result pair consisting of a false success indicator and the input control array. Otherwise, if verification passes, the base logic is used. |
| Verify Value | A numeric value that will be evaluated against the input control array count. |
| Verify Criteria | The criteria used when performing the verification. Within this example, Equals is the only supported criteria option. |
| Find Children | Find Children creates a new control array consisting of child controls matching the provided property name/value pair and criteria. The starting contexts for the child searches are the controls provided via the input control array. The base logic is then executed using the new control array as the input to each child Declarative Function. In the event that no children are present, the new control array is returned in the Result pair. |
| Property Name | The name of the control property to be queried. |
| Property Value | The value to be compared against the property query result. |
| Match Criteria | The criteria used when performing the comparison. Within this example, Equals is the only supported criteria option. |
| Filter Collection | Filter Collection creates a new control array consisting of control from the input control array matching the property name/value pair and criteria provided. The base logic is then executed using the new control array as the input to each child Declarative Function. In the event that no children are present, the new control array is returned in the Result pair. |
| Property Name | The name of the control property to be queried. |
| Property Value | The value to be compared against the property query result. |
| Match Criteria | The criteria used when performing the comparison. Within this example, Equals is the only supported criteria option. |
| Verify Property | Verify Property performs a verification using the property name/value pair and criteria provided. If verification fails, execution returns with a Result pair consisting of a false success indicator and the input control array. Otherwise, if verification passes, the base logic is used. |
| Property Name | The name of the control property to be verified. |
| Property Value | The value to be compared against the control's property value. |
| Match Criteria | The criteria used when performing the verification. Within this example, Equals is the only supported criteria option. |
| On Failure | Overrides the default behavior of the base logic. If a verification failure occurs when this value is set to continue, execution returns a Result pair consisting of a true success indicator and the input control array. |
| Click | Click performs a mouse click on the first control provided via the input control array. In the event that the control array is empty, execution returns a Result pair consisting of a false success indicator and the input control array. Otherwise, the base logic is used. |
| Mouse Button | Indicates which mouse button to click. Within this example, Left is the only supported option. |
| Click Type | Indicates how many clicks to perform. Within this example, Single is the only supported option. |

FIG. 8A

SYSTEM AND METHOD FOR AUTOMATED TESTING OF SOFTWARE APPLICATIONS WITH DYNAMIC USER INTERFACES SPANNING MULTIPLE TECHNOLOGIES

CROSS-REFERENCE TO RELATED APPLICATIONS

This application is a continuation of U.S. patent application Ser. No. 13/006,759, filed on Jan. 14, 2011, entitled SYSTEM AND METHOD FOR AUTOMATED TESTING OF SOFTWARE APPLICATIONS WITH DYNAMIC USER INTERFACES SPANNING MULTIPLE TECHNOLOGIES, now U.S. Pat. No. 8,997,053, issued on Mar. 31, 2015. Application Ser. No. 13/006,759 claims benefit of U.S. Provisional App. No. 61/259,042, filed Jan. 14, 2010. U.S. patent application Ser. Nos. 13/006,759 and 61/259,042 and U.S. Pat. No. 8,997,053 are hereby incorporated by reference in their entirety.

BACKGROUND

Test automation is, for example, the use of software to control the execution of tests, the comparison of actual outcomes to predicted outcomes, the setting up of test preconditions, and other test control and test reporting functions. Test automation often involves automating a manual process that is already in place and uses a formalized testing process.

BRIEF DESCRIPTION OF THE DRAWINGS

The accompanying drawings incorporated in and forming a part of the specification illustrate several aspects of the present disclosure and, together with the description, serve to explain the principles of the present disclosure. In the drawings:

FIG. 7A illustrates an example of the hyper text mark-up language (HTML) code for an application observed by the abstraction layer of FIG. 2;

FIG. 8A illustrates a table of example declarative functions used in the customization process of FIG. 8;

DETAILED DESCRIPTION

Figure 1:
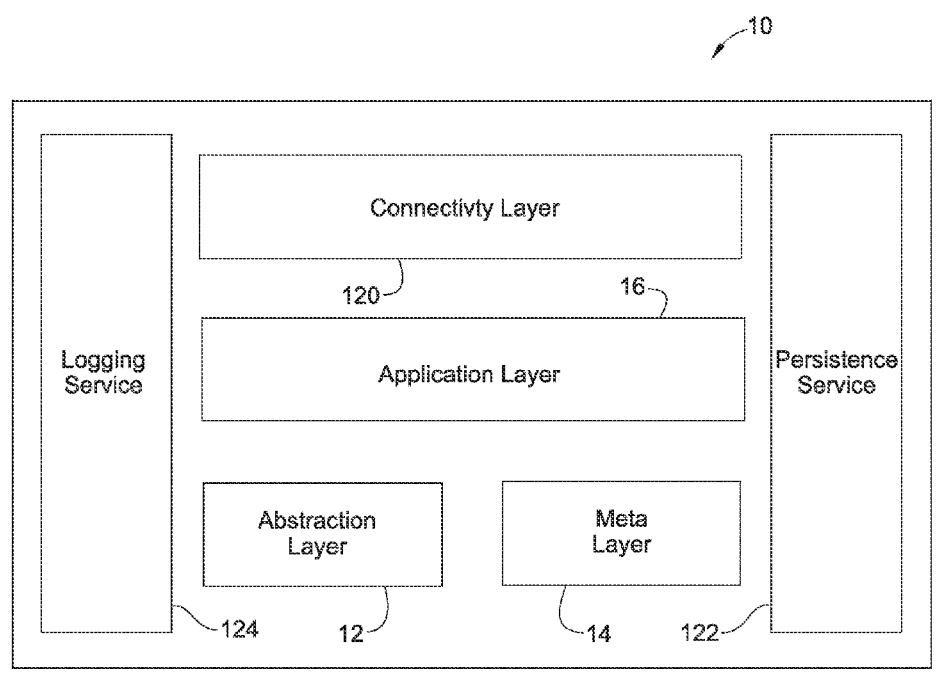
FIG. 1 is a diagram illustrating an embodiment of a system for software testing.

Referring to FIG. 1, embodiments of the present disclosure provide an extensible, display-independent software testing system 10 and method designed to simplify the creation and maintenance of control identification algorithms and test libraries as well as the process of creating the automated tests. As will be more fully explained below, the system 10 permits automated software testing across multiple software platforms for applications with dynamically generated user interfaces that can be rendered using a mix of display technologies and programming languages.

System 10 employs a multi-layer architecture that uses encapsulation and abstraction to address different dependencies that exist within the automated testing solution domain. As will be described, this approach creates a separation of responsibilities between the system developers, the control test suite designers, and the automated test designers. This separation is designed to maximize the solutions flexibility in order to deal with custom application complexities without the need for constant software updates from the automated testing solution provider.

For each technology supported by system 10, the system developers may implement a compiled module that creates and updates an object hierarchy of the user interface controls for each running application using the supported technology. Each control within the object hierarchy is encapsulated within an abstraction designed to both provide a common interface to the rest of the system and hide any dependencies on the underlying technology or functional libraries used in its implementation, These object hierarchy instances are registered with a broker component, by which the other layers of the system may access the running applications.

The control test suite designers access system 10 by means of user interface provided by the system. This user interface provides a drag-and-drop method of designing a control test suite by means of a toolkit of graphical widgets and a property editor. When adding support for a new control, the designer uses the widgets to first create a reusable, common interface description for the control, followed by an implementation. Once the controls for a given application have been defined and implemented, the designer then creates a hierarchy of parent-child relationships between implementations using the widget toolkit. This relationship hierarchy is then combined with an object hierarchy for an application to create an application hierarchy of control instances found within a running application. Also associated with each node in the relationship hierarchy is a set of uniqueness rules, also created by the designer, used to determine the data that will be extracted from each control in the application hierarchy during the process of identifying controls for an application under test. In addition to defining control test suites, a user interface of system 10 also contains a set of widgets that allow the implementer to design a set of transformation rules used to re-map previously identified controls of an application once it has been ported to a new technology.

Within system 10, each widget in the toolkit corresponds to a generic, precompiled meta-object of the system 10. Each widget used by a designer is customized to its specific purpose by means of a property editor. The property editor receives data for the properties of each widget. Each time a widget is configured within the user interface, a new instance of its corresponding meta-object is created and its properties are initialized with the user provided data. As controls suites, relationship hierarchies, and rule sets are defined within the user interface, the underlying meta-objects are chained together to create the reusable execution logic of control libraries supporting the automated testing of a specific application. Due to the separation between the generic meta-objects and their initialization (a.k.a., property) data, the system is capable of persisting the designer defined content into a number of different formats and storage mediums, which can easily be distributed to other systems or reconstructed at a later time.

Embodiments of the present disclosure provide a system, method, and computer program product for creating and maintaining user interface control test libraries used in the automated testing of software applications. Still referring to FIG. 1, system 10 uses a multi-layer architecture with supporting infrastructure services. Each layer encapsulates and abstracts dependencies and points of change within the automated testing solution problem domain. An abstraction layer 12 hides supported application technology dependencies from the other layers by representing user interface content for each application as a generic control hierarchy implementing a common interface for user interaction emulation and state (a.k.a., property) verification. A meta layer 14 decouples the identification and functional algorithms of the user interface control test library from the user interface content for each of the software applications a user is interacting with. Because unique control types typically remain behaviorally equivalent between different technology implementations, meta layer 14 also separates control test interfaces from their implementation. This promotes a reusable, unified control interface suite that allows extensibility without breaking implementation compatibility. An application layer 16 decouples the application-specific parent-child relationships and uniqueness rules used for persisting control references from the system defined control implementations and application control content.

In automated testing solutions, the responsibilities of creating automated tests may be separated between two parties. For example, system developers may implement the technology interfaces the algorithms to find controls in a user interface for supported application, and the control test libraries used to interact with controls while automated test designers may use these solutions to select the controls around which they build scripts to emulate manual workflows for a specific application. In the event that changes are made to the user interface for application such that unsupported controls are added or currently supported control implementations are changed, automated test designers may need to wait on the system developers to introduce software updates to the system to support modification.

In some embodiments, the responsibilities of the system designer may be split between two parties. The system developers remain responsible for designing the technology interfaces. However, the responsibilities of creating the control identification algorithms and control test libraries is assumed by control test suite designers. By separating these responsibilities, system 10 enables test suite designers to deal with general or application-specific functional needs without requiring software updates from the system developers.

This separation may be achieved within the architecture of system 10 by special-pull JOSe, system-provided meta-objects that are combined to define the complex structures of a test library and its algorithms. Meta-objects are instances of pre-compiled software classes used to define a piece of a control test library, such as a control type, a property, an action or an algorithm unit of work. Control test suite designers request new or existing meta-objects by means of system provided creation application programming interfaces (APIs), which can easily be wrapped within a drag-and-drop user interface of widgets. Meta-objects may be customized (i.e., tailored to a user specified behavior) by means of meta-object properties that represent (i.e., define) the object's user customizable data. Each meta-object creates a well defined separation between the user provided data and its executable behavior by implementing separate APIs for each purpose.

Within system 10, the meta-object property API used to get and set property names and values is uniform across all meta-object types. This enables system 10 to provide a standardized means of persisting and reconstructing meta-objects regardless of the their underlying type. A meta-object's executable behavior, on the other hand, is implemented (i.e. exposed) by a specialized, meta-object type specific API.

Collectively, the control definitions created by combining these meta-object types make up the test library API of system 10, which is available to automated test designers. These meta-objects point to and include implementation algorithms created using declarative functions that are chained together. Declarative functions are created by the system developers and deployed with the system as its declarative function library. Each unique declarative function implementation provides a self-contained unit of work When the encapsulated logic of a declarative function is executed, there will exist, in many cases, one or more conditions under which execution is considered to have failed, such as a verify property declarative function not matching the property criteria it was assigned. When this occurs, or a sub-branch (i.e., other declarative functions that have been chained to the current declarative function) returns a failure, the declarative function returns to its immediate caller without executing any further logic or sub-branches. By default it returns a failure to its caller. However, by means of a declarative function property this can be overridden to return success even on failure. The result of this behavior is that though each branch will be executed, specific branches may be prematurely ended by means of a failure.

Figure 2:
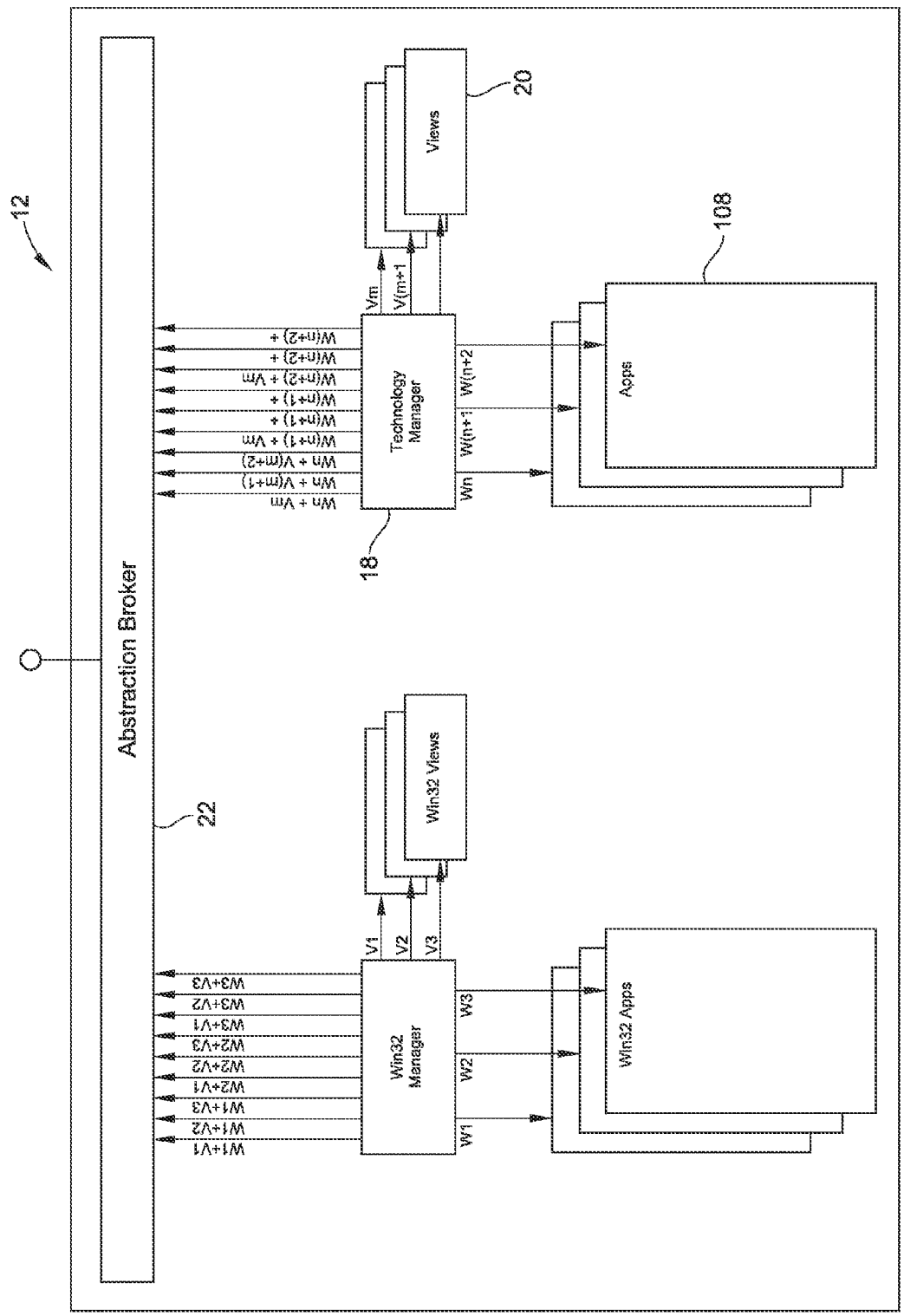
FIG. 2 is a diagram illustrating an embodiment of an abstraction layer from the system of FIG. 1.

Referring now to FIG. 2, abstraction layer 12 comprises three conceptual components: technology managers 18, views 20, and an abstraction broker 22. Technology manager 18 is the component responsible for interfacing with a supported technology. Technology manager 18 observes the running applications and hooks into any applications that are implemented using the technology it supports. When a new application is first hooked or its user interface changes state, technology manager 18 passes the user interface content of the application to each of the views 20 associated with the technology. Views 20 are the components of abstraction layer 12 responsible for navigating technology-specific user interface content and abstracting them into a technology-nonspecific control hierarchy. Each member of the hierarchy is an object that wraps a user interface element and uses the API of the element to implement a common control interface for accessing the properties of, and emulating user interaction with, the element. Views 20 are not required to create a control hierarchy that mimics the original user interface hierarchy or contains all the original user interface elements. As its name suggests, its abstraction creates a view of the original user interface content that may implement additional goals, such as simplifying complexity, creating more intuitive parent-child relationships, or eliminating redundant or formatting elements. As a result, a given technology may implement views 20 more than once per supported technology. Once control hierarchies are created by views 20, they are made accessible to the other layers (e.g., meta layer 14 and application layer 16) of system 10 through abstraction broker 22. In other words, views 20 produce control hierarchies providing a technology-independent representation of graphical elements for a naming application and parent-child relationships between the graphical elements.

Figure 7B:
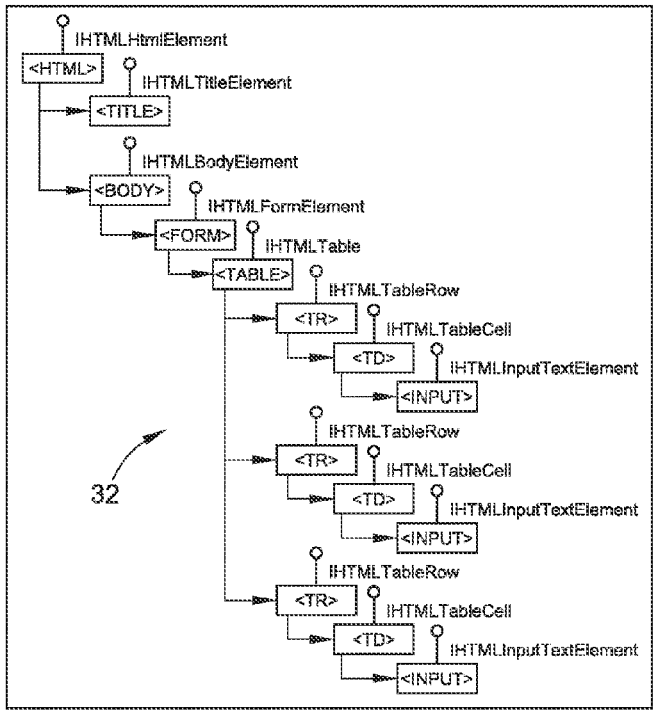
FIG. 7B illustrates an example of a document object model (DOM) generated by processing the code of FIG. 7A.
Figure 7C:
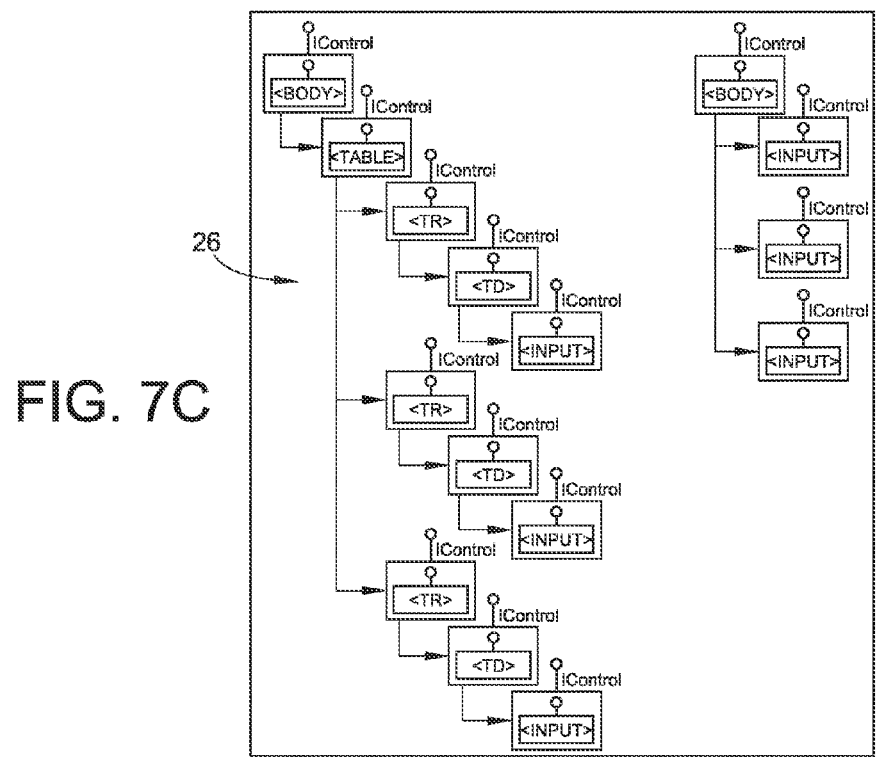
FIG. 7C illustrates an example of view control hierarchies generated by processing the DOM of FIG. 7B.

As an example, consider an execution flow 24 of abstraction layer 12 in the context of an HTML-base application as collectively illustrated in FIGS. 7A-7C. In this scenario, a Technology Manager component is designed to interface with Internet Explorer (IE) browsers running on a Windows host machine. Its implementation runs on an independent thread and uses the ShellWindows object, provided in the SHDocVw COM library, to periodically poll the running IE browsers. Once a new IE browser is identified, it acquires an InternetExplorer object reference to the browser that it will use to register for events signaling changes to the state of the users interface. Access to the user interface of the HTML application is provided through the Document Object Model (DOM) of InternetExplorer. The DOM provides an object hierarchy of the HTML content (including the user interface) currently loaded within the browser. Two IE View components have also been implemented as part of this scenario. As shown in FIG. 7C, IE View1 26 implements an algorithm that creates a control hierarchy containing all user interface HMTL elements, including those used for formatting. The algorithm for IE View2 28 further minimizes its control hierarchy to include only those elements that enable user interaction (i.e., INPUT).

With the IE Technology Manager running, an IE browser is loaded, which points to an HTML Login page whose content 30 is shown in FIG. 7A. After loading the page, a DOM hierarchy 32 of the browser exists in a state represented in FIG. 7B. Each element in DOM hierarchy 32 (a.k.a., DOM representation) is labeled with the HTML element it encapsulates and shows the HTML type-specific interface it exposes. DOM hierarchy 32 is then passed by technology manager 18 of FIG. 1 to each of the views 20 associated with the IE Abstraction layer solution. After receiving DOM hierarchy 32, each of the views 20 will begin a depth-first search that navigates the tree according to the following path:

HTML→TITLE→BODY→FORM→TABLE→TR→TD→INPUT→TR→TD→INPUT→TR→TD→INPUT

When components from each of the views 20 encounter a DOM object that its algorithm accepts as a member of its control hierarchy, each of the views 20 creates a control object specifically designed to re-wrap the interface API of the DOM object with a common IControl interface shared by all members of the control hierarchy. The created control object is then added to the child collection its closest ancestor control object found along the path between itself and the root. If no control object meeting this criterion is found, then the control object becomes the root of the control hierarchy as is the case with the BODY object. FIG. 7C contains the resulting control hierarchy trees created by each of the views 20. The control hierarchy of IE View1 26 appears on the left and the control hierarchy of IE View2 28 appears on the right. As per their algorithms, the control hierarchies of IE View1 26 and IE View2 28 contain the three interactive INPUT elements. The control hierarchy of IE View1 26 also contains the BODY, TABLE, TR and TD formatting elements. Both IE View1 26 and IE View2 28 use the BODY element as their hierarchy root.

Once the control hierarchies of IE View1 26 and IE View2 28 are returned to technology manager 18 (e.g., an IE technology manager), they are registered with abstraction broker 22. Each registration links a control hierarchy instance with an identification pair that is made up of an application identifier and a view identifier. Over time, as the user interface state of each browser changes, the manager responds by refreshing the corresponding IE View hierarchy instances (e.g., IE View1 26 and IE View2 28) and re-registering the new instances using the same identification pair.

The design and implementation of each component within the abstraction layer 12 may be the responsibility of the system developers. As new technologies emerge, corresponding implementations of technology manager 18 and the views 20 may be developed to enable system 10 to interact with their user interfaces.

Figure 3:
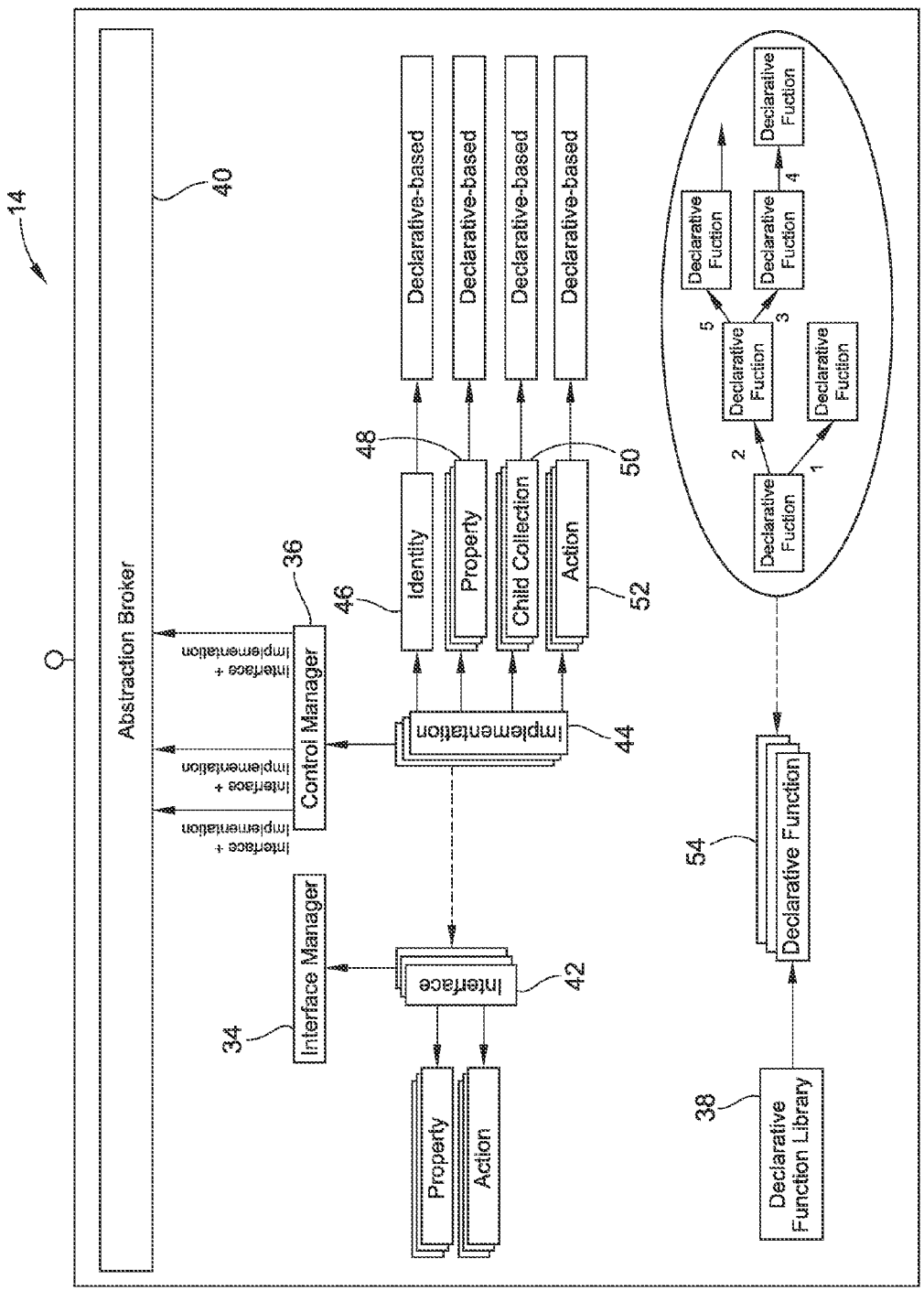
FIG. 3 is a diagram illustrating an embodiment of a meta layer from the system of FIG. 1.

Referring now to FIG. 3, meta layer 14 provides control test suite designers with a collection of pre-compiled meta-objects that are combined to create the suite of supported user interface control test libraries of system 10 from FIG. L The four core components of meta layer 14 are an interface manager 34, a control manager 36, a declarative function library 38, and a meta broker 40, In addition, meta layer 14 also provides seven types of meta-objects: interfaces 42, implementations 44 (a.k.a., controls), identities 46, properties 48, child collections 50, actions 52, and declarative functions 54.

The process of creating a mew control test library begins with defining the functional interface of the control using interface 42, property 48, and action 52 meta-objects. Interface 42 is a simple meta-object that manages a collection of properties 48 and actions 52. These collections store property 48 and action 52 meta-object instances created and added to the interface 42 by a designer to declare the set of verifiable properties and emulate-able user actions supported by a control test library implementation. Before adding any meta-object to an interface 42 collection, the designer may first assign it a name that is unique to the all property 48 and action 52 currently managed by the interface 42. In addition, the designer may also declare the set of expected values before adding any action 52 meta-object to the interface 42. These expected values are unique string identifiers that represent the data passed to the action 52 meta-object when it is executed.

It should be noted that each interface 42 created by a designer does not necessarily have to be associated with a single control type. It is possible to define an interface 42 that may be implemented (i.e., different implementations 44 are created) for different control types sharing common properties and user interaction behavior (i.e., actions), such as a textboxes and password fields or checkboxes and radio buttons. Using this interface meta-objects paradigm (i.e., the previously defined approach), a standardized library of common interfaces can be defined that promotes reuse across different implementations and technologies.

After an interface 42 meta-object has been created or modified, it is registered with interface manager 34 using a name unique to all interfaces 42 currently defined within system 10. Each interface manager 34 implements an API that handles addition, removal, retrieval, and persistence of interface 42 meta-objects.

Once the interface 42 has been created, a designer creates a test library implementation using the implementation 44 meta-object. The implementation 44 meta-object is created using a selected (user created) interface 42 that acts as its creation prototype. The implementation 44 with manage read-only property 48 and action 52 collections that contain the same property 48 and action 52 members defined in its corresponding interface 42 as well as a collection of child collection 50 meta-objects. These child collection 50 meta-objects are optional constructs that enable designers to develop reusable algorithms that return specialized collections of nested controls, such as day or month elements within a calendar control. As is the case for property 48 and action 52 meta-objects, before child collections 50 are added to the collection of the implementations 44, they are assigned a name that is unique with respect to all members of the child collection 50. Each implementation 44 also contains a reference to a single identity 46 meta-object that a designer uses to create an algorithm for identifying instances of the control associated with the implementation 44.

Each meta-object associated with (i.e., added to) an implementation 44 hosts (i.e. has assigned to it) a specialized algorithm created by the implementation (a.k.a., control test suite) designer. These algorithms are created by chaining together (i.e., combining by adding to their collections) declarative function 54 meta-objects that the user selects. Meta layer 14 provides a library of declarative function meta-objects, designed and implemented by the 10 system developers, which provide the functionality to organize and interact with the control hierarchies of abstraction layer.

It should be noted that depending on the underlying technology, control test library implementations 44 may either be generic (a.k.a., most basic) or application-specific solutions. This is best conceptualized when considering HTML-based applications. When a designer, such as a control test suite designer, creates control test library implementations 44 for HTML, the generic or most basic approach is to focus on the low-level or primitive HTML control types that make-up the language. However, in sophisticated HTML-based applications, the lack of support for modem controls, such as trees and calendars, forces developers to create composite controls, typically made up of a dynamic number of low-level or primitive controls, to bridge this gap. These composite control (designs) may be either application-specific or templates within an HTML application rendering framework. Using the generic approach, an end user, such as an automated test designer, manages not only the identification of all low-level controls used in the composite control, but also the complex scripts required to emulate user interaction with the composite control. An alternative to this approach is to create test library implementations 44 specific to and for the composite control (type) that hides this complexity from the automated test designer.

Once implementations 44 have been fully configured or assembled they must be registered with control manager 36 using a name unique to all implementations 44 within system 10. Like interface manager 34, control manager 36 is responsible for managing the life cycle of all implementations 44 that have been registered within system 10 and must provide an API that handles their addition, removal verification, retrieval, and persistence.

Figures 8, 9:
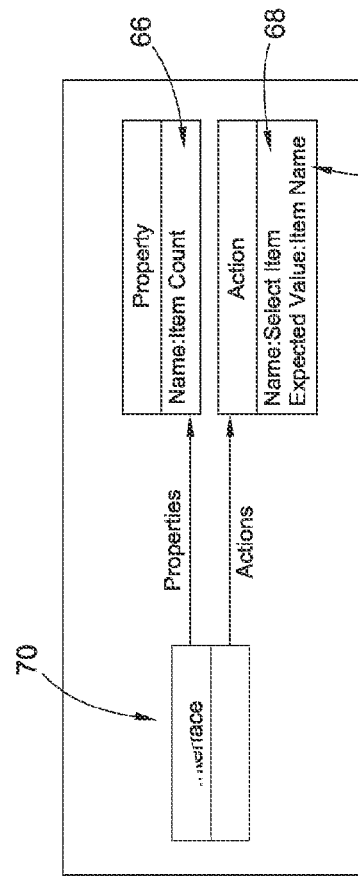
FIG. 8 illustrates an example of an HTML drop-down control used to demonstrate the customization process of the meta layer of FIG. 3.
FIG. 9 illustrates an example of an interface generated based on the HTML drop-down control of FIG. 8.

As an example of this process, consider an HTML-based application that contains a custom drop-down composite control. Referring now to FIG. 8, a possible HTML rendering of a drop-down control 56 is depicted. Control 56 starts with a DIV element 58 that provides the parent context used for cascading style sheet (CSS) positioning of the nested elements. Within the DIV 58 are a read-only INPUT element 60 that displays the selected item, an IMG element 62 that acts as the click target for triggering the drop-down, and a DIV element 64 that contains the selectable items offered by the drop-down. Since script and class details of each element are not required to implement a test library for this drop-down control 56, they have been omitted from the sample HTML.

For this example, it is assumed that the instances of the drop-down control defined in FIG. 8 would emulate a look and behavior of a traditional drop-down control. In addition, it is assumed that system 10 has provided view 20 for abstraction layer 12 for HTML called OneToOne implements a one-to-one mapping of HTML interactive and formatting elements (i.e., HTML primitive elements) to controls in the control hierarchy. Because the choice of declarative functions 54 available in declarative function library 38 of meta layer 14 in FIG. 3 is left to the system developers, this example uses seven possible declarative functions 54 that meet the needs of the meta-object algorithms (i.e., algorithms created using declarative functions that are associated with each property 94, action 98, child collection 90, and identity 86). Their purpose and parameters are described in the table in FIG. 8A. The algorithms in the example are displayed such that any declarative function 54 containing more than one executable branch will order their execution from top to bottom.

After analyzing the test cases created for this application, it is determined that the test library for the control includes an item count property 66 and a select item action 68. Based on this determination, an interface 70 for this control is constructed as shown in FIG. 9. The property collection of interface 70 contains a single property meta-object that has been assigned the name item count 66 and it is action collection contains a single action meta-object that has been assigned the name select item 68. Select item action 68 also defines a single expected value item name 72. Interface 70 is then registered with the interface manager 34 using the name drop-down interface.

Figure 10:
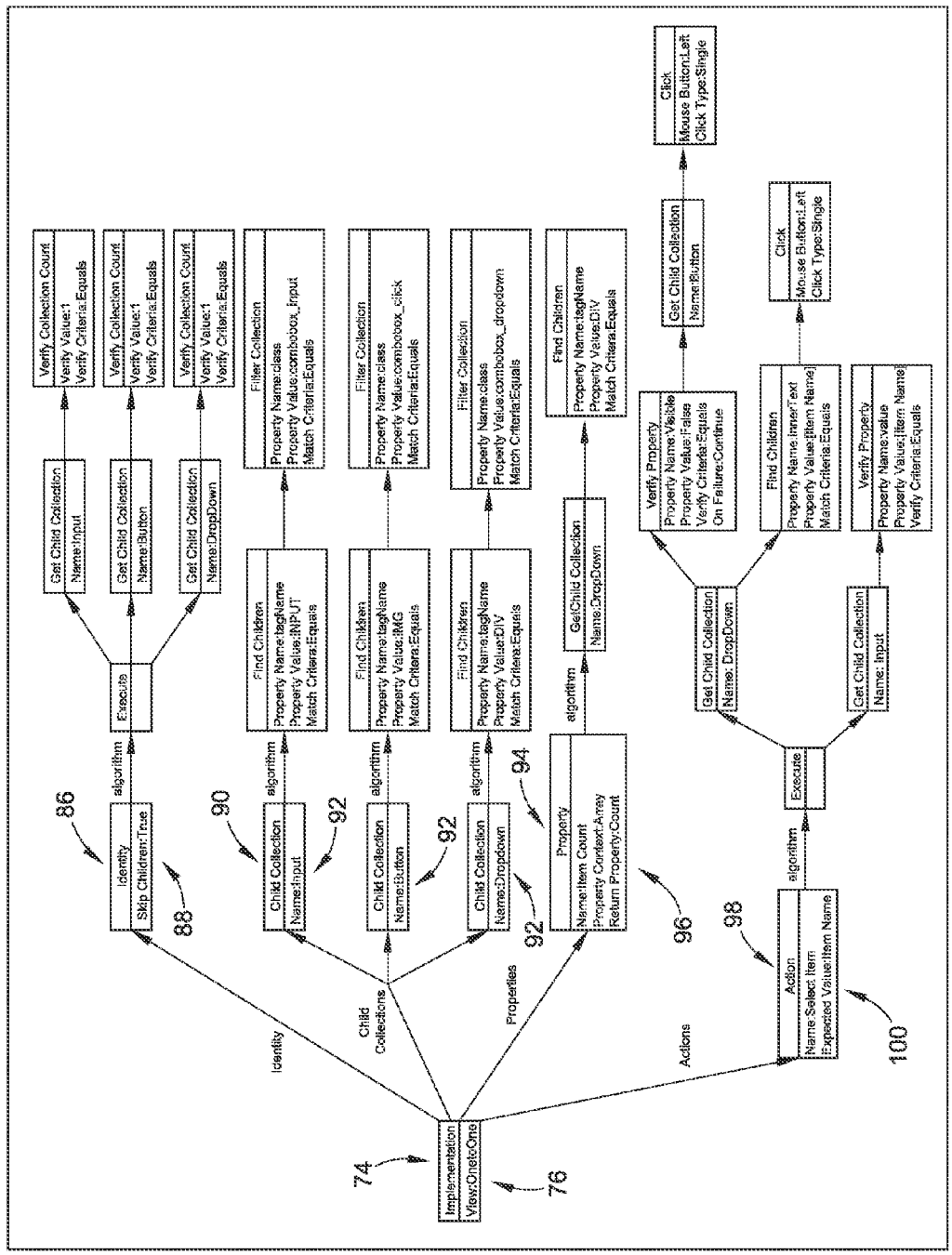
FIG. 10 illustrates an example of an implementation meta-object based on the interface of FIG. 9.

Using this interface 70, an implementation 74 meta-object is created and configured as shown in FIG. 10. Implementation 74 defines a single meta-object property called view 76, which defines the expected view type for the implementation 74 as OneToOne. In addition to the property 94 and action 98 defined in its associated interface 70 (FIG. 9), implementation 74 also defines and contains an identity 86 and three child collection 90 meta-objects. Each child collection 90 extracts specific child control elements of the drop-down that are required within the identity 86, property 94, and action 98 algorithms.

In this example, the identity 86 meta-object of implementation 74 defines a single meta-object property called skip children 88 in addition to its declarative function-based algorithm. Because the value is set to true, the calling algorithm (a.k.a., the caller) should skip all nested children (i.e., any other children of the control hierarchy instance where a match is made). The algorithm of the identity 86 has been designed based on the assumption that the three visual components of the drop-down control, which are the input field, the clickable button, and the drop-down list, all have a unique class attribute that are not listed by the any other control constructs within the application.

To understand how the algorithm of the identity 86 identifies drop-down control instances, assume that there exists an algorithm that navigates (a.k.a., navigation algorithm) the control hierarchy (i.e., the view 20 created control hierarchy) structure of the HTML application using a depth-first search. At each control (i.e., the control instance in the control hierarchy) encountered by this algorithm, the identity 86 of the drop-down is executed passing the current control hierarchy instance as its parameter. Each time this occurs, the identity 86 executes its associated algorithm, passing the array as a parameter. If execution returns a true success indicator a match is identified and the navigation algorithm skips the current control hierarchy instances children during its traversal due to the skip children 88 meta-object property of the identity 86. If execution returns a false success, there is no impact on the navigation algorithm's traversal. Using the declarative functions 54 previously defined, the logic now of the identity 86 algorithm is as follows.

Execution begins in the execute declarative function 54, which contains three logic branches (i.e., user added declarative functions). Each branch is designed to retrieve a child collection 90 and verify that the array (i.e., collection) count consists of a single member. According to the configuration of the algorithm, the child collections 90 are evaluated in order from Input to Button to DropDown. If any branch returns a success indicator of false to execute, execution returns a result with the success indicator set to false. However, if all three branches return a result pair containing a true success indicator, the execute returns a corresponding result with a success indicator set to true.

The algorithm of identity 74 is responsible for not only evaluating whether meta layer 14 control has been identified but also determines what control hierarchy instance is the starting context from which all other algorithms for meta-objects begin. When identity 86 returns a result indicating that a match was made to the provided control hierarchy instance, the reference to that instance is a pair consisting of implementation 74 and the control hierarchy instance provided when the match was made. All other meta-objects (i.e., property 94, child collections 90, and action 98) belonging to implementation 74 are passed the identity 86 matched control hierarchy instance as their starting context.

Three child collection 90 meta-objects are defined within the implementation 74 and used by the algorithm for identity 86. Each is assigned a single meta-object property value called name 92, which represents the lookup name of the child collection 90 when called via a declarative function 54. Though the algorithm for each child collection 90 uses the same declarative functions 54 and organization, each returns a different array (a.k.a., collection) of controls hierarchy instances due to customization differences in the meta-objects properties. The algorithm for each child collection 90 begins by using the starting context control hierarchy instance to search its children for hierarchy controls that have a specific HTML tag. Once this array has been constructed, it is then reduced to only those controls or instances that match on a specific HTML class name. The configuration customizations result in an input child collection matching INPUT HTML tags and the class name combobox_input, a button child collection matching IMG HTML tags and the class name combobox_click, and a DropDown Child Collection matching DIV HTML tags and the class name combobox_dropdown.

The property 94 meta-object defines three meta-object properties 96. The first is the name property whose value is inherited from the interface property meta-object used to create the Implementation. The property context properly enables the designer to de fine the source from which the property value will be queried. In this example, the value has been set to array, which indicates that the array returned from the result for the algorithm will be used as the source. An alternative value would be control, which would indicate that the first control in the result array would be the source. The property value provides the name of the property to be queried from the source object, in this case the property count. Given this configuration, the property 94 will execute its algorithm and given a result pair with a success indicator of true, will query the element count of the associated control array.

The algorithm for the property 94 is comprised of two declarative functions 54 that returns a control array containing the selectable items of the drop-down meta layer 14 control. The process of creating this array begins by retrieving the Drop Down child collection 90. Using the single control hierarchy instance contained within this array as the starting context, each child control hierarchy instance that has an HTML tag type property of DIV is added to a new control hierarchy array. This control array is then returned as the result via the result pair.

The action 98 meta-object defines the two meta-object properties 100 name and expected value whose values are inherited from the interface action meta-object. Because this action 98 has an associated expected value, its execution includes both a starting context control as well as an expected value name/value pair array. The expected value array for this action 98 contains a single name/value pair which defines the runtime value associated with the item name identifier.

The algorithm for the action 98 is designed to select a drop-down item by name, following a three step process. Each step is represented by a declarative function 54 branch that starts at the root execute (declarative function). The first branch checks whether the drop-down is visible and if it's not clicks the drop-down button. Note that if the visible property of DropDown is not true, then the on failure property prevents the branch from continuing execution and prevents a success indicator of false from being returned. It then identifies the DropDown items and searches for an item that matches the item name value. If a match is made, the item is clicked. If an item was selected, the algorithm then verifies that the current value displayed in the input field of the drop-down is equal to the item name value. If all three steps return a success indicator of time, then the action 98 returns an indicator that is passed. Otherwise, it retu111s an indicator that it failed.

With the implementation 74 complete, the design process ends by registering the implementation 74, with the control manager 36 of meta layer 14. The name used when registering the implementation 74 is preferably unique and may include details related to its application and control context to assist in avoiding a name clash. In this example the implementation 74 of the control is registered with the name my app drop-down implementation. A final registration with the meta broker 40 is made to make this implementation visible to other layers (e.g., abstraction layer 12, application layer 16) within the system 10. This registration provides the implementation 74 and associated interface 42 meta-objects and names.

Figure 4:
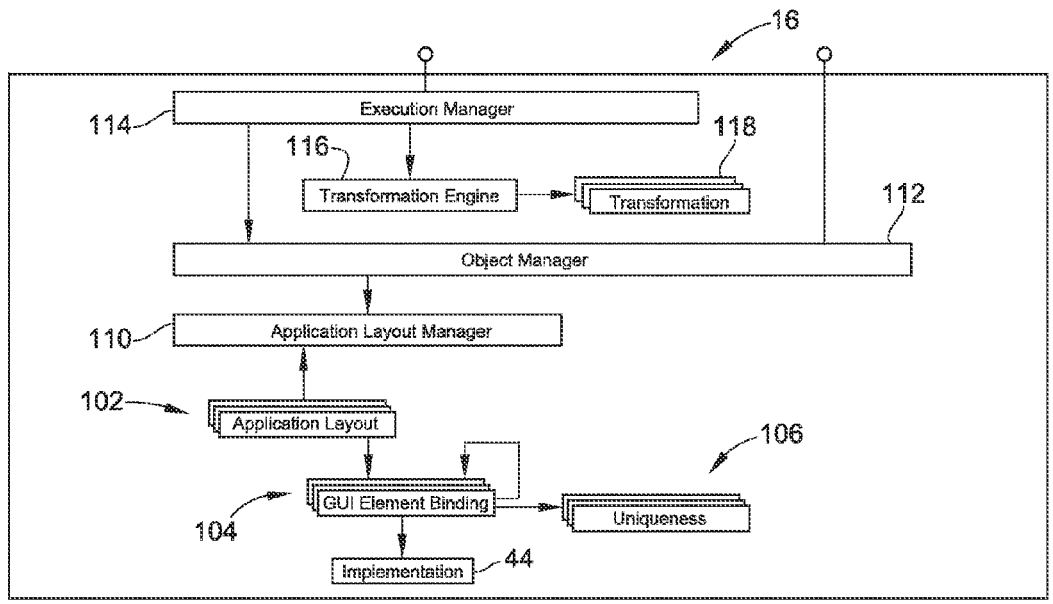
FIG. 4 is a diagram illustrating an embodiment of a application layer from the system of FIG. 1.

Referring now to FIG. 4, application layer 16 has dual responsibilities within the system 10. It provides control test suite designers with a set of meta-objects used to customize tree structures that represent the allowed parent-child relationships between meta-layer 14 implementations (e.g., implementation 74) for a given application or technology. Each implementation defined within the meta-layer 14 provides an identity 46 meta-object used to identify instances of the control it represents in an application. Each application layer 16 tree structure also enables the designer to define rules that are evaluated for each identity 46 identified instance to determine what control hierarchy instance properties are needed to identify a specific instance within the context of its application screen. By combining an implementation of a tree structure relationship with a control hierarchy of a running application from the abstraction layer 12, the application layer 16 creates a new hierarchy whose elements are control of an implementation 44 and the identified control hierarchy instance for that implementation. This hierarchy is used by three APIs defined within the application layer 16 that enable test designers, such as automated test designers, to extract references for controls of interest in a given screen, transform these control references to new references of the same control implemented within a different technology, and execute actions 52 or properties 48 of a control.

The application layer 16 parent-child tree structures are designed using an application layout 102, GUI Element Binding 104, and uniqueness rule 106 meta-objects. Each tree structure is encapsulated and contained by an application layout 102 meta-object customized using its meta-object properties to indicate that technology and view 20 is compatible with the contained tree, application layout 102 meta-objects maintain a GUI Element Binding 104 collection that supports the addition of multiple GUI Element Binding 104 meta-objects, with each GUI Element Binding in an application layout 102 representing the root of a tree structure, Multiple tree structures defined for a single application layout 102 are allowed to support technologies that provide more than one top-level window types such as dialogs versus standard windows.

Each node of a tree structure is created using a GUI Element Binding 104 meta-object which contains a GUI Element Binding 104 collection, a uniqueness rule 106 collection and a reference to an implementation 44 meta-object (FIG. 3). The implementation 44 meta-object referenced by the GUI Element Binding 104 defines the control type associated with the node. Each child GUI Element Binding 104 added to a parent GUI Element Binding 104 collection defines an allowable meta layer 14 implementation 44 that may be found nested within the parent meta-layer 14 implementation 44. A GUI Element Binding 104 with no elements in its GFI Element Binding 104 collection is a leaf node of the tree structure and represents a meta-layer 14 control that is not a container for other meta-layer 14 controls. References to a single GUI Element Binding 104 meta-object may be added to many GUI Element Binding 104 collections, which in some cases may create circular references within the tree structure. This behavior is allowed to ensure that repeating parent-child pattern matches may be identified regardless of the depth of a control hierarchy of an application 108 (FIG. 2).

When GUI Element Binding 104 meta-objects are evaluated against an application control hierarchy (e.g., DOM hierarchy 32), their associated identity 46 from implementation 44 is used to evaluate hierarchy controls for a match to the meta layer 14 control encapsulated by the implementation 44. When a match is made to a hierarchy control, the APIs for the application layer 16 will be required to provide a relocate-able string-based reference to the hierarchy. Each reference contains a series of name/value pairs that encode properties of the tree structure used to evaluate the control hierarchy of the source application 108 and the identity 46 matched hierarchy control. The tree structure properties used in a reference are queried from the application layout 102 meta-object encapsulating the current tree structure. The control hierarchy instance properties used in a reference are determined by executing the uniqueness rule 106 collection members of the GUI Element Binding 104. Each uniqueness rule 106 provides meta-object properties that define the criteria under which the rule is applied and the property name whose value should be used use as part of the reference. When the uniqueness rules 106 for the a GUI Element Binding 104 are executed, each uniqueness rule 106 is passed the control hierarchy instance for which a reference is being created. Using this control hierarchy instance, the uniqueness rule 106 then evaluates all meta-object property defined criteria, which in a simple implementation would constitute property verifications. Using this approach as an example, if all properties passed verification, then the uniqueness rule 106 would query the control for the value associated with the test designer defined property name. The property name and value would then be encoded into a name/value pair format and added to the end of the current reference string. If one or more properties failed verification, the uniqueness rule 106 exits execution, effectively skipping the rule.

Once a tree structure has been configured, it is registered with the application layout manager 110, using a name unique to all application layouts 102 registered within the system 10. The application layout manager 110 is responsible for managing the life cycle of all application layouts provide an API that handles their addition, removal, verification, retrieval, and persistence.

The method for creating automated tests within the system includes two processes. In the first process, the test designer extracts references to specific meta-control instances used in their test cases. The application layer 16 API supporting this process is implemented by the object manager 112 component. This API for the component provides methods that enable a test designer to query for tree structures and running applications 108 visible within the system 10. Then by passing a selected target application and a tree structure that supports the chosen application 108, the test designer calls the API of the object manager 112 to request the control instances for the current screen. The control instances returned to the test designer are represented as their string-based reference created by the uniqueness rules 106 of the GUI Element Binding 104.

Once references are created, the test designer implements scripts that emulate the user interaction required for their test cases. This second process is supported by the API for the execution manager 114, which implements methods to execute actions and retrieve or verify properties of a meta-control using a reference input. Before an action 52 or property 48 can be executed, an implementation 44 meta-object and starting context hierarchy control is acquired by resolving the input reference to a member of the application layer created hierarchy. The API of the execution manager 114 calls on the API of the object manager 112 to perform this reference resolution. In addition to the reference, a name is provided which indicates the property 48 or action 52 meta-object that will executed by the script call. Lastly, in the case of executing actions 52, the user provides any name/value pairs that correspond to the expected values of the action 52.

The API of the execution manager 114 also provides methods that allow references created for a specific application and technology to be transformed into equivalent references for the same application in a different technology. These methods are supported by the transformation engine 116 component of the application layer 16. Before an application 108 technology-specific reference can be transformed, the test suite designer configures the transformation engine 116 using transformation rule 118 meta-objects. Similar to uniqueness rules 106, transformation rules 118 include one or more criteria and associated result. Each transformation rule 118 takes the source reference string as an input and if its criteria, such as name/value pairs matching on a value or pattern, are verified as true, will return a string representing a fragment of the transformed reference. Like declarative functions 54, system developers may choose to implement different types of transformation rule 118 to handle static and dynamic re-mapping of references.

Static rules enable designers to alter some aspect of a name/value pair according to logic that is known at design time while dynamic rules require a live application to be present that provides a runtime context from which session specific values can be re-mapped. Once all existing transformation rules 118 are executed, a new reference returned by the transformation engine 116 is created by concatenating all fragments together.

Referring back to FIG. 1, a connectivity layer 120 provides a plug-in service architecture that enables system developers or third-party providers a means of creating connectivity interfaces to the system 10. By means of the public APIs exposed by each layer (e.g., abstraction layer 12, meta layer 14, application layer 16) of the system 10, each plug-in can create domain, business and/or application models that best support the type of connectivity interface they implement. Examples of connectivity interface implementations include established protocols and technologies such as tcp/ip, named pipes, web services, COM/DCOM, Net, JAVA, CORBA as well as custom, GUI based applications designed to create and execute automated test scripts.

The persistence service 122 is responsible for defining and providing a persistence API to those system layers, where meta-objects are created by test suite designers. A possible system persistence strategy is for each meta-object type to implement a common persistence AP I that allows the extraction of meta-object property names and associated values. Using this approach, the persistence data for each meta-object is reduced to its type and meta-object property data. Since meta-object properties are either strings or references to other meta-objects, persistence data is extracted hierarchically and as such lends itself to persistence mediums or encoding strategies such as XML that support data relationships.

The logging service 124 provides a standard means by which any layer can report information during the course of system 10 execution. The logging service may provide alternative means by which users can capture logging data during system use. In addition, depending on the implementation used to enable test suite designers to create meta-layer 14 and application layer 16 meta-objects, the logging service may choose to support multiple logging channels or levels that enable separation between different types or classifications of logs, such as layer-created, declarative function-created, or exception-created logs.

Figure 5:
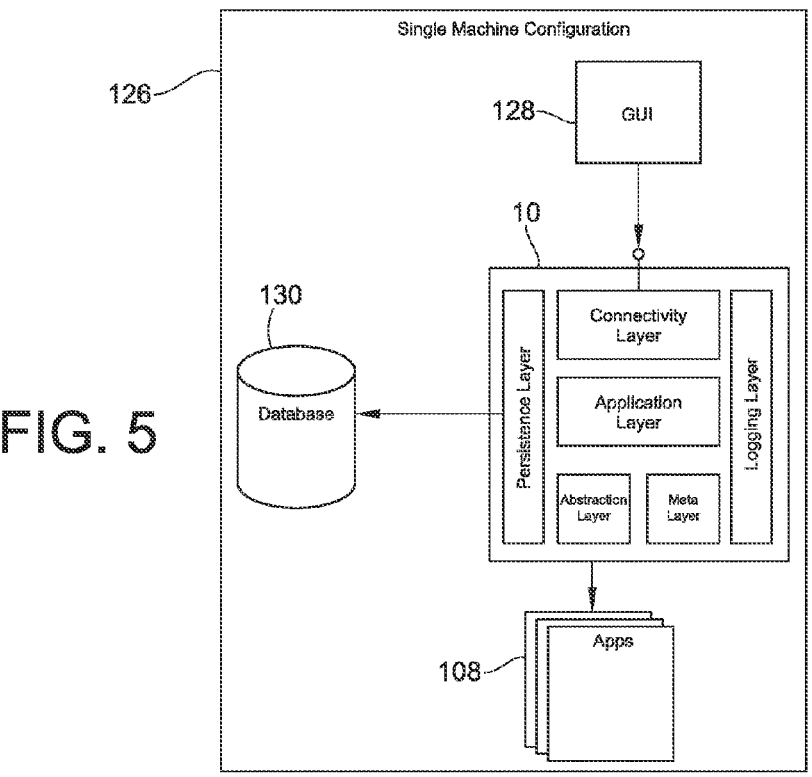
FIG. 5 is a diagram illustrating an embodiment of the system of FIG. 1 on a single host machine.

This system 10 has been designed to provide a layered API designed to decouple and abstract automated testing solution dependencies into components that alloy the greatest flexibility and extensibility. The system 10 software responsible for meeting this aspect includes three types of external dependencies. Generally, these are a driver that provides direction, a medium for persistence of system data, and the applications 108 under test. In FIG. 5, there is displayed an example configuration of the system assuming deployment on a single machine 126. In this example, the driver 128 is represented as a GUI and the persistence medium 130 a database. However, these could be any form of communication supported by the connectivity layer 102 of the system 10 or persistence technology available. Deployment options for the system 10 software are largely based on the approach used to implement the system 10.

Figure 6:
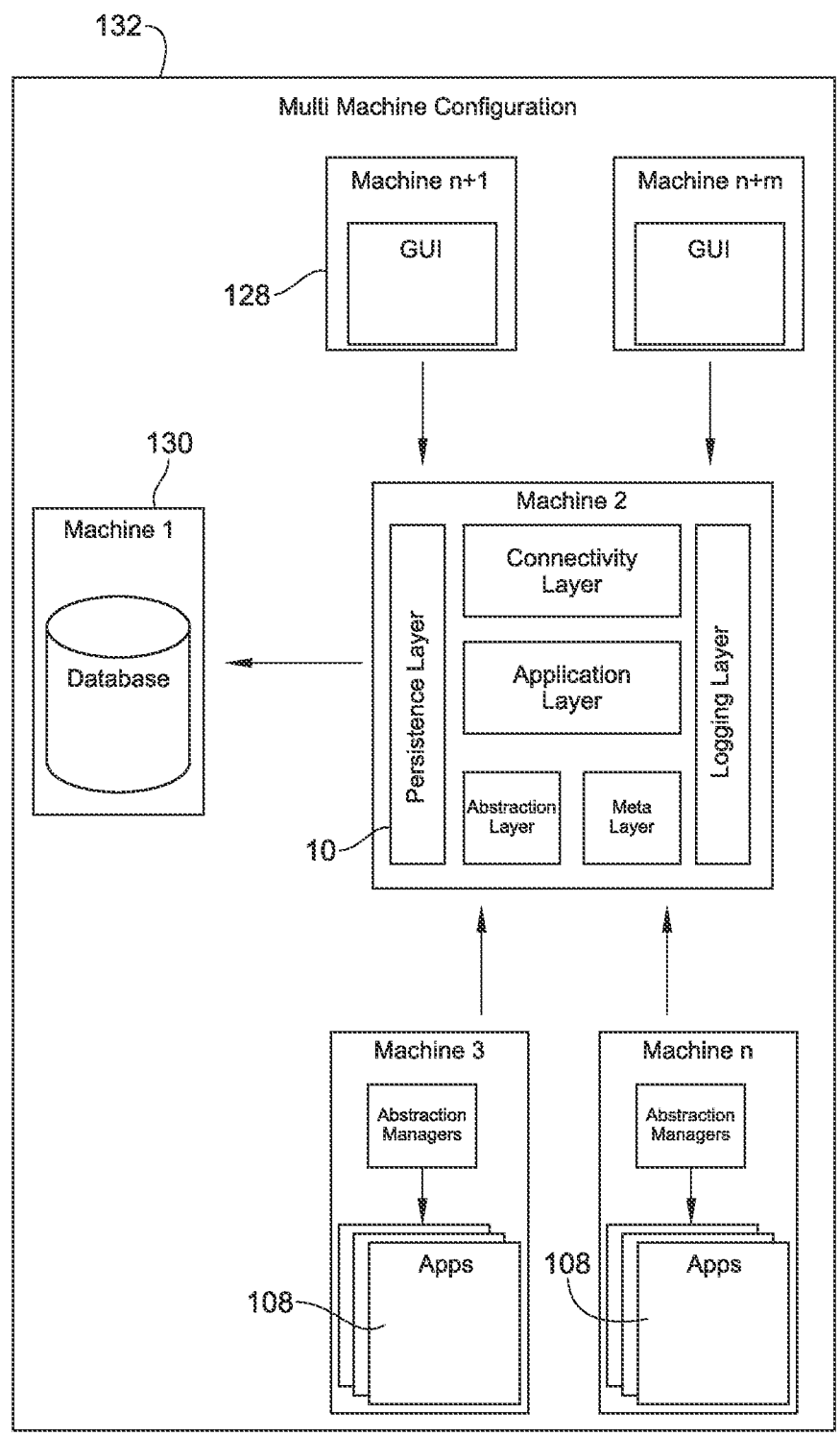
FIG. 6 is a diagram illustrating an embodiment of the system of FIG. 1 on several host machines.

FIG. 6 shows a possible multi-machine 132 deployment configuration assuming the system has been implemented as a multi-user server or service capable of servicing many client connections simultaneously. In this scenario, each user that connects to the system does so by means of a GUI installed as a client application of their machine. In addition, the abstraction layer 12 of the system 10 has been implemented such that the abstraction broker 22 component has been separated from the technology managers 18 and views 20 which are deployable as independent, self-contained servers. The abstraction broker 22 hosted in the system listens for incoming connection requests from all deployed technology manager 18 servers registering located applications on their local machine, allowing the system to access remote applications. According to this deployment configuration, the number of machines used is dependent on the number clients and technology manager 18 servers installed across the customer network. Assuming each system 10 dependency is installed on a different machine, four machines would be required at a minimum for the database 130, system 10, GUI 128, and applications under test (AUTs).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure array take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that various functions or operations of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/acts specified. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified.

What is claimed is:

1. A method of testing a running application from a viewpoint of a user of a graphical user interface of the running application, comprising:
    defining, using a computer hardware processor, generic control implementations of the graphical user interface of the running application using a plurality of collection driven algorithms;
    defining, using the programmed processor, a plurality of hierarchical declarative function meta-objects describing operation of each of the plurality of the collection driven algorithms of at least one of an identity, property, collection or action meta-object associated with the generic control implementations, each of the plurality of declarative function meta-objects defining a predetermined result responsive to execution of at least one declarative function without providing any detail of how the predetermined result is achieved;
    receiving at least one abstraction layer object as input and generating a second at least one abstraction layer object as output responsive to the plurality of algorithms for an associated meta-object of a generic control implementation executing the received abstraction layer object;
    emulating user interactions occurring external to the running application between the user and the graphical user interface, each of the generic control implementations providing a technology-independent representation of graphical visual controls of the graphical user interface of the running application to emulate the user interactions with the graphical user interface occurring external to the running application.

2. The method of claim 1, wherein the generic control implementations and their meta-object algorithms create a generic user interface control hierarchy.

3. The method of claim 2, wherein the generic control implementations comprise identity meta-objects for use in creating the generic user interface control hierarchy.

4. The method of claim 1, wherein the generic representation comprises a technology independent representation.

5. A non-transitory, computer readable medium including instructions which, when executed by a computer hardware processor, implement an automated software testing process for testing a running application from a viewpoint of a user of a graphical user interface of the running application comprising:
    defining, using the computer hardware processor, generic control implementations of the graphical user interface of the running application using a plurality of collection driven algorithms;
    defining, using the computer hardware processor, a plurality of hierarchical declarative function meta-objects describing operation of each of the plurality of the collection driven algorithms of at least one of an identity, property, collection or action meta-object associated with the generic control implementations, each of the plurality of declarative function meta-objects defining a predetermined result responsive to execution of at least one declarative function without providing any detail of how the predetermined result is achieved;
    receiving at least one abstraction layer object as input and generating a second at least one abstraction layer object as output responsive to the plurality of algorithms for an associated meta-object of a generic control implementation executing the received abstraction layer object; and
    emulating user interactions occurring external to the running application between the user and the graphical user interface, each of the generic control implementations providing a generic representation of graphical visual controls of the graphical user interface of the running application to emulate the user interactions with the graphical user interface occurring external to the running application.

6. The computer readable storage medium of claim 5, wherein each of the generic control implementations and their meta-object algorithms create a generic user interface control hierarchy.

7. The computer readable storage medium of claim 6, wherein the generic control implementations comprise identity meta-objects for use in creating the generic user interface control hierarchy.

8. The computer readable storage medium of claim 5, wherein the generic implementation comprises a technology independent representation.

9. An automated software testing system for testing a running application from a viewpoint of a user of a graphical user interface of the running application, comprising:
    a computer hardware processor;
    a plurality of meta-layer implementations, executed by the computer hardware processor, defining controls of the graphical user interface using a plurality of algorithms from the viewpoint of the user of the graphical user interface of the running application, each of the meta-layer implementations receiving at least one abstraction layer object as input and generating a second at least one abstraction layer object as output responsive to execution of the plurality of algorithms using the at least one abstraction layer object for at least one of an associated identity, property, collection or meta-object;

a plurality of declarative function modules for defining each of the plurality of algorithms for each of the plurality of meta-layer implementations, each of the plurality of declarative function modules defining a predetermined result responsive to execution of a declarative function responsive to the at least one abstraction layer object without providing any detail of how the predetermined result is achieved; and a common user interface for emulating user interactions occurring external to the running application between the user and the graphical user interface, each of the meta-layer implementations providing a generic representation of graphical visual controls of the graphical user interface of the running application to emulate the user interactions with the graphical user interface occurring external to the running application.

10. The system of claim 9, wherein each of the plurality of meta-layer implementations and their algorithms create a generic user interface control hierarchy.

11. The system of claim 10, wherein the meta-layer implementations comprise identity meta-objects for use in creating the generic user interface control hierarchy.

12. The system of claim 9, wherein the generic representation comprises a technology independent representation.

* * * * *